United States Patent [19]
Dalbiez

[11] Patent Number: 5,217,409
[45] Date of Patent: Jun. 8, 1993

[54] TORSION DAMPER FOR A MOTOR VEHICLE DISC-TYPE CLUTCH

[75] Inventor: André Dalbiez, Argenteuil, France
[73] Assignee: Valeo, Paris Cedex, France
[21] Appl. No.: 798,182
[22] Filed: Nov. 26, 1991
[30] Foreign Application Priority Data Nov. 28, 1990 [FR] France ............................ 90 14872

[51] Int. Cl.⁵ ........................... F16D 3/14; F16D 3/66
[52] U.S. Cl. .................................... 464/68; 192/30 V; 192/106.1; 192/106.2; 464/71
[58] Field of Search ................. 464/85, 62–68, 464/71, 81; 192/30 V, 106.1, 106.2; 74/443

[56] References Cited
U.S. PATENT DOCUMENTS

| | | | |
|---|---|---|---|
| 4,212,380 | 7/1980 | Billet | 192/106.2 |
| 4,613,029 | 9/1986 | Beccaris | 192/106.2 |
| 4,655,337 | 4/1987 | Carmillet et al. | 192/106.2 |
| 4,883,156 | 11/1989 | Rohrle et al. | 192/106.2 |
| 5,169,357 | 12/1989 | Graton | 192/106.2 X |

Primary Examiner—Daniel P. Stodola
Assistant Examiner—William G. Battista, Jr.
Attorney, Agent, or Firm—Longacre & White

[57] ABSTRACT

A torsion damper comprises two coaxial parts, one of which comprises a damper plate and a hub, coaxial with each other and having respective complementary sets of teeth. A resilient member in the form of a shock absorbing ring is provided in the same coaxial part of the damper and is coupled in rotation to the damper plate. The shock absorbing ring comprises at least one substantially rigid first member, on which the set of complementary teeth is formed, together with at least one resiliently deformable second member for coupling in rotation with the damper plate.

10 Claims, 5 Drawing Sheets

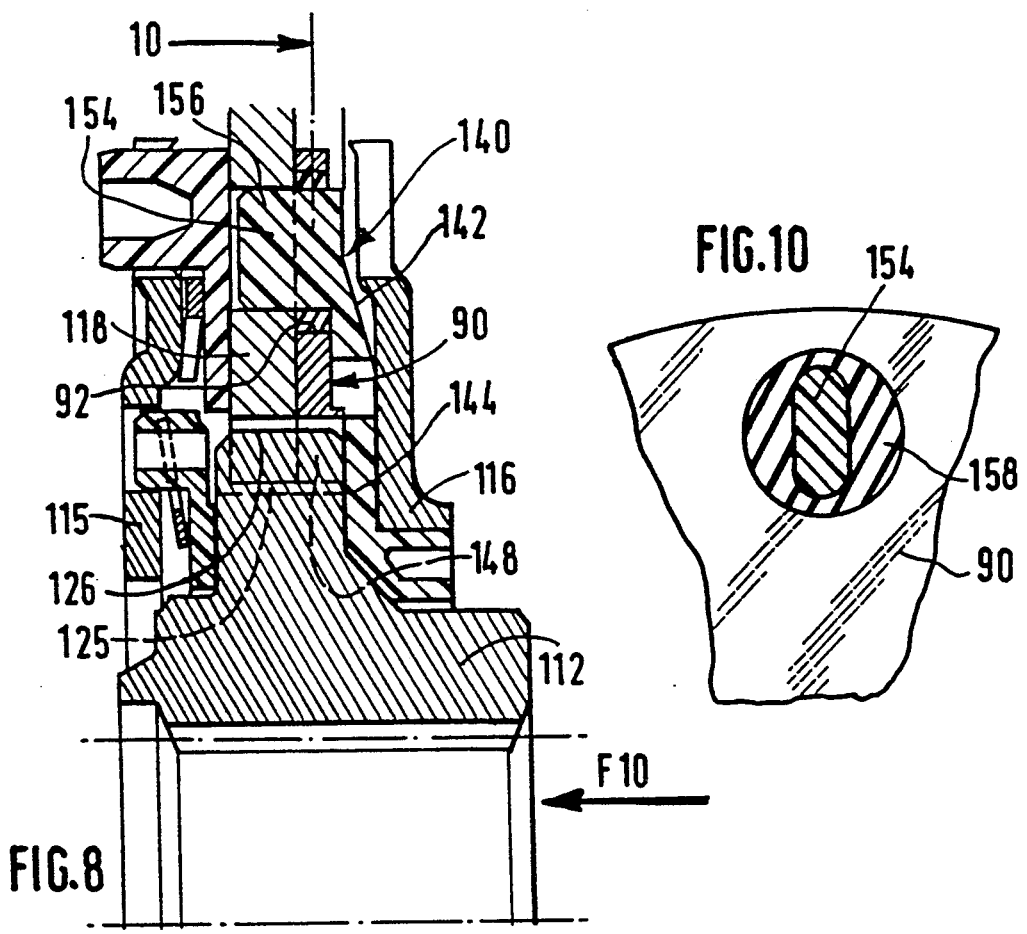
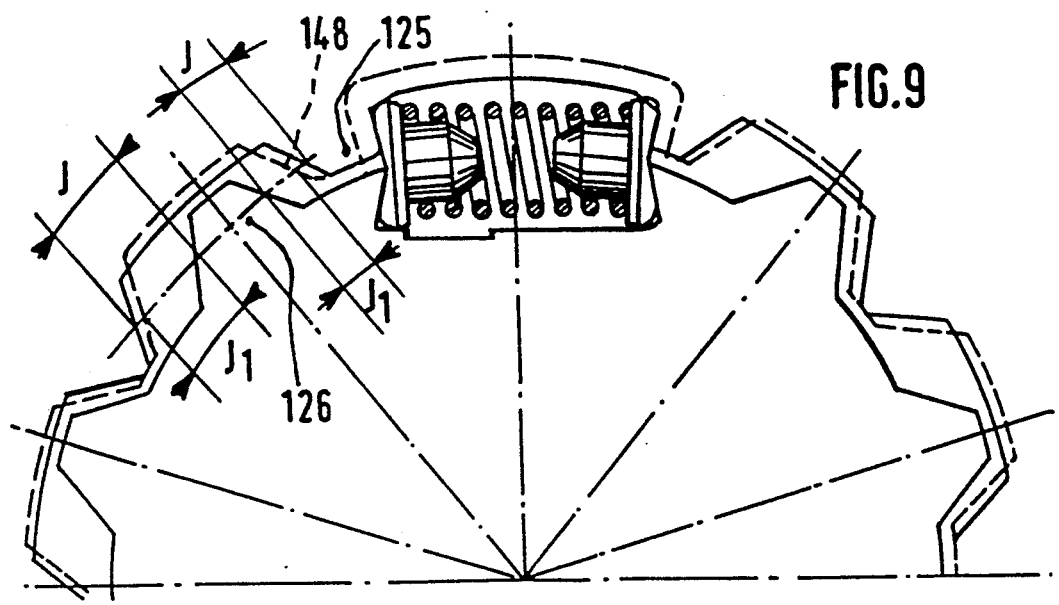

TORSION DAMPER FOR A MOTOR VEHICLE DISC-TYPE CLUTCH

FIELD OF THE INVENTION

The present invention relates to a torsion damping device, in particular for a friction clutch of the disc type for a motor vehicle, the torsion damping device being a torsion damper comprising two coaxial parts which are mounted for relative rotational movement with respect to each other through a limited angle and against the action of first resilient means, in which one of the two said coaxial parts comprises a damper plate and a hub, mounted coaxially with each other and for relative rotation with respect to each other, against the action of second resilient means and over a sector of angular displacement which is defined by complementary sets of teeth formed on the damper plate and on the hub, with the complementary sets of teeth defining a circumferential clearance between them.

BACKGROUND OF THE INVENTION

A torsion damper of the above kind is described in the specification of U.S. Pat. No. 4,613,029, which proposes to provide third resilient means interposed circumferentially between the damper plate and the hub. These third resilient means are so designed as to enable the teeth of the damper plate to come into positive circumferential abutment with the teeth of the hub, while at the same time producing a noise-suppressing or sound-deadening braking effect. In this way the damper plate teeth are enabled to come gently into engagement with the hub teeth, with noises due to impact between the two sets of teeth thus being avoided. In one embodiment, a ring of resilient material is engaged around one of the teeth of one of the sets of teeth, in a groove on that tooth, and is arranged to be compressed by the neighbouring teeth of the other set.

Such an arrangement is effective when the equipment is new, but is liable to deteriorate over a period of time. In addition, the teeth which receive these damping rings (or the damping ring if there is only one) are weakened, and the torque which they can transmit is thus reduced.

In order to overcome the above drawbacks, it has been proposed in the unpublished French patent application No. 90 07866, filed on 22 Jun. 1990 in the name of the same Applicant as French patent application No. 90 14872 on which the present application is based, to make the third resilient means in the form of a ring of resilient material which extends parallel to the damper plate and which is provided with a set of teeth complementary to those on the hub. These complementary teeth mesh with the hub teeth, defining between them a further circumferential clearance which is smaller than the circumferential clearance that is provided between the damper plate teeth and the hub teeth. The set of teeth on the hub is extended axially so that it can mesh with those of the damper plate and the said ring (the latter being referred to as a shock absorbing ring herein).

The shock absorbing ring is arranged to rotate with the damper plate, and is of resiliently deformable material at its inner periphery. In certain applications, with a view to simplifying manufacture, and also with a view to obtaining satisfactory durability, it may be desirable that this shock absorbing ring is made rigid at its inner periphery.

DISCUSSION OF THE INVENTION

An object of the present invention is to satisfy the above criteria without weakening either the teeth on the damper plate or those on the hub, and to provide an arrangement which will remain effective over an extended period of time.

In accordance with the invention, a torsion damper having a shock absorbing ring, of the general type described above is characterised in that the shock absorbing ring comprises at least one substantially rigid first member on which the said set of teeth, complementary to those of the hub, is formed, together with at least one resiliently deformable second member for rotational coupling with the damper plate.

The invention enables the manufacture of the shock absorbing ring to be simplified, because the complementary set of teeth is formed in the rigid first member and the deformations of the deformable second member are properly controlled over a period of time. In addition, the teeth on the hub and the damper plate are neither modified nor weakened.

In one embodiment of the invention, advantage is taken in a cost-effective and simple manner of the bearing which is interposed radially between one of the guide rings of the torsion damper and the hub, by forming the said complementary teeth in the hub itself. Preferably, a ring of resiliently deformable material is then engaged on each of the spigots which are normally provided on the said bearing for coupling it in rotation with the damper plate, with each of these rings penetrating into an opening which is provided for this purpose in the damper plate.

In another embodiment of the invention, in which the said bearing forms a spacer between the guide ring and the damper plate, advantage is taken of this arrangement by using the space which is thereby made available to interpose a ring, in that space, between the bearing and the damper plate. This ring carries the said complementary set of teeth at its inner periphery, while at its outer periphery it carries rings of resilient material, each of which is engaged on a corresponding one of the spigots formed on the bearing.

The outer periphery of this ring can of course be of resilient material and be coupled in rotation to the spigots through a coupling of the tenon and mortice type.

Further features and advantages of the invention will appear more clearly from a detailed reading of the description which follows, of various preferred embodiments of the invention, given by way of example only and with reference to the accompanying drawings.

BRIEF DESCRIPTION OF THE DRAWINGS

FIGS. 8 to 10 are views similar to those in FIGS. 3 to 5, but showing a third embodiment of the shock absorbing ring.

DESCRIPTION OF PREFERRED EMBODIMENTS OF THE INVENTION

Figures 1, 2:
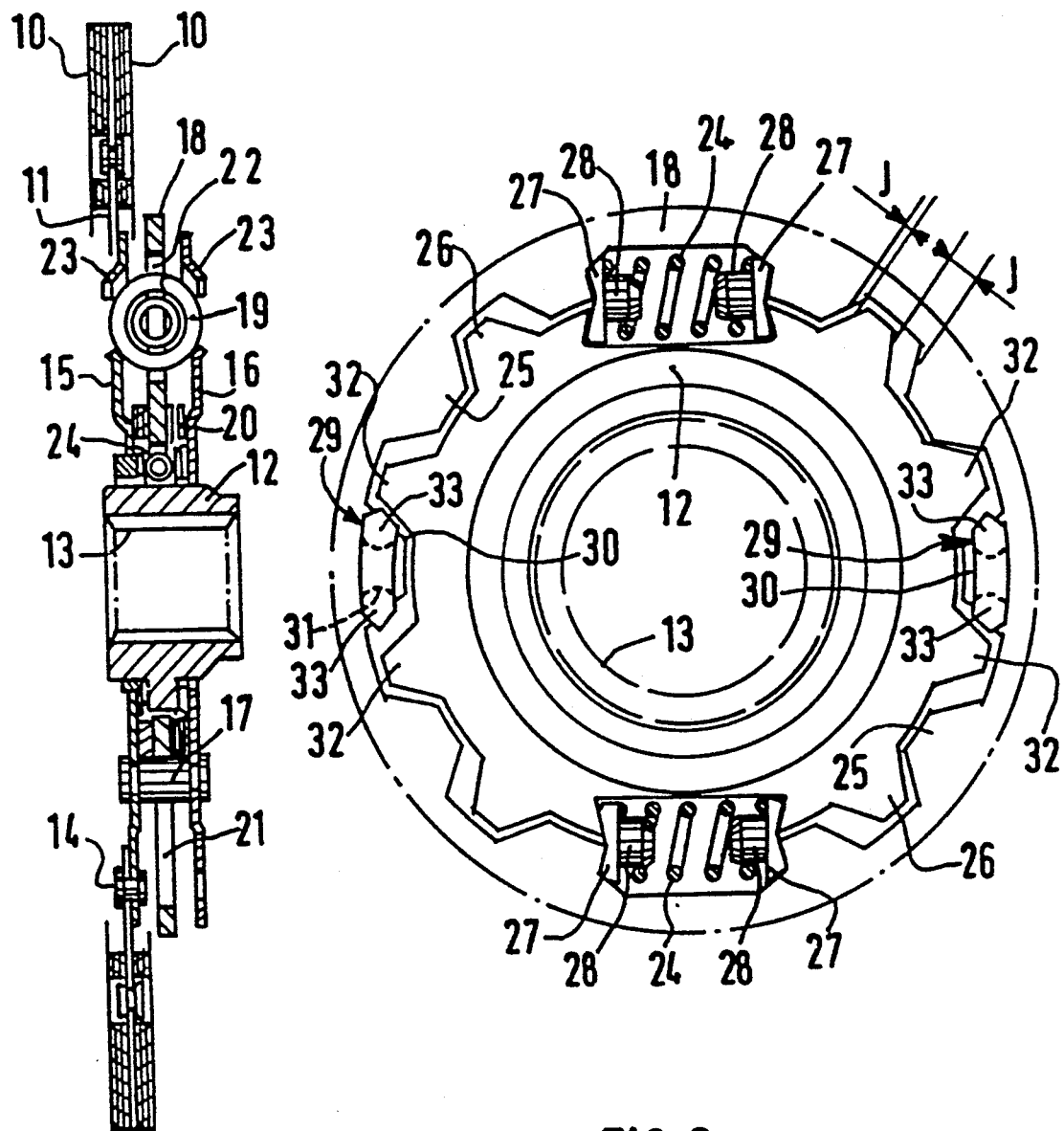
FIG. 1 is a view in axial cross section of part of a disc-type friction clutch of the prior art, having a torsion damper.
FIG. 2 is a view on a larger scale, and in elevation, showing the sets of teeth of the damper plate and hub seen in FIG. 1, with the torsion damper incorporating blocks of resiliently deformable material.

FIGS. 1 and 2 show one application of a torsion damping device for a disc-type friction clutch for a motor vehicle, identical to that which is disclosed in the specification of U.S. Pat. No. 4,613,029, to which reference is invited for the details of the design and construction of this torsion damper. It will however be mentioned here that this torsion damping device comprises two coaxial parts, namely a first part 10, 11, 15, 16 and a second part 12, 18. These coaxial parts are mounted for limited relative rotational movement against the action of first resilient means 19 in the form of coil springs.

The second coaxial part 12, 18 itself comprises a damper plate 18, lying generally in a radial plane, and a hub 12 which is coaxial with the damper plate 18. These two components 12 and 18 are mounted for rotational movement with relation to each other against the action of second resilient means 24, again in the form of coil springs. The springs 24 act during the relative displacement of the damper plate 18 and hub 12 through an angular sector which is defined by complementary sets of teeth 25 and 26, formed respectively on the damper plate 18 and hub 12 (in a projected flange of the latter) and having the appropriate circumferential clearance J which defines the above mentioned angular sector of relative displacement.

The first coaxial part comprises friction pads 10, which are mounted on an annular clutch plate 11 on either side of the latter. The friction pads 10 carried by the clutch plate 11 are adapted to be gripped between the pressure plate and reaction plate of the clutch (not shown), which are secured to an engine crankshaft for rotation with the latter. The hub 12, surrounded by the damper plate 18, is adapted to be engaged, by means of splines 13, on a driven shaft, not shown, which in this example is the input shaft of the gearbox of the motor vehicle, so that the hub 12 is rotatable with the gearbox input shaft.

The clutch plate 11 is secured by means of rivets 14 to a guide ring 15, the latter being connected to another guide ring 16 by means of spacers, which in this example are in the form of pins or short bars 17. For this purpose the spacers 17 pass through the damper plate 18 via openings 21 which are formed in the latter. The guide rings 15 and 16 are mounted for rotation around the hub 12, without any set of teeth or similar elements being interposed. The damper plate 18 which is thus arranged axially between the two guide rings 15 and 16. It will be appreciated that the sets of teeth 25 and 26 limit in the circumferential direction the extent of possible rotation of the damper plate 18 with respect to the hub 12.

The first resilient means 19 consist of a plurality of circumferentially acting helical springs mounted in windows 22 formed in the damper plate 18, and also in further windows 23 which are formed, facing the windows 22, in the guide rings 15 and 16. The stiffness in compression of the resilient means 24 is smaller than that of the springs 19. The springs 24 are again circumferentially acting resilient springs, and are interposed between the damper plate 18 and the hub 12 through end thrust inserts 27. Each end thrust insert 27 has a rear face of dihedral profile, and on its opposite side it has a spigot 28 for centring engagement with the associated spring 24. The purpose of the springs 24 is essentially to filter out noise, for example gearbox noise or dead centre noise, when the torque which is transmitted through the torsion damping device is either zero or very small. The springs 24 are mounted in slots which are formed partly in the inner periphery of the damper plate 18 and partly in the outer periphery of the hub 12, in zones in which these slots take the place of the teeth 25 and 26. The springs 19, in combination with friction means 20, are interposed between the two coaxial parts of the torsion damper, and their function is essentially to damp out those vibrations which arise between the engine shaft and the driven shaft while the vehicle is in motion.

A further set of resilient means, here referred to as third resilient means, are also provided, for the purpose of suppressing or reducing the undesirable consequences of violent and noisy impact between the teeth of the set 25 and those of the set 26. In FIG. 2, these third resilient means act circumferentially, and comprise two blocks 29 in the form of rings of a resilient material. Each block 29 is engaged around one tooth 30 of the set of teeth 25 of the damper plate, being fitted in a groove 31 formed on this tooth. The blocks 29 are adapted so as to be compressed by the two adjacent, corresponding teeth 32 of the set of teeth 26 on the hub 12. In the part of the description that follows, various forms of these circumferentially acting resilient means and embodying the principles of the present invention, together with elements that are common or similar to the present invntion and to the prior art, will be designated by the same reference numerals.

Figures 3, 5, 13:
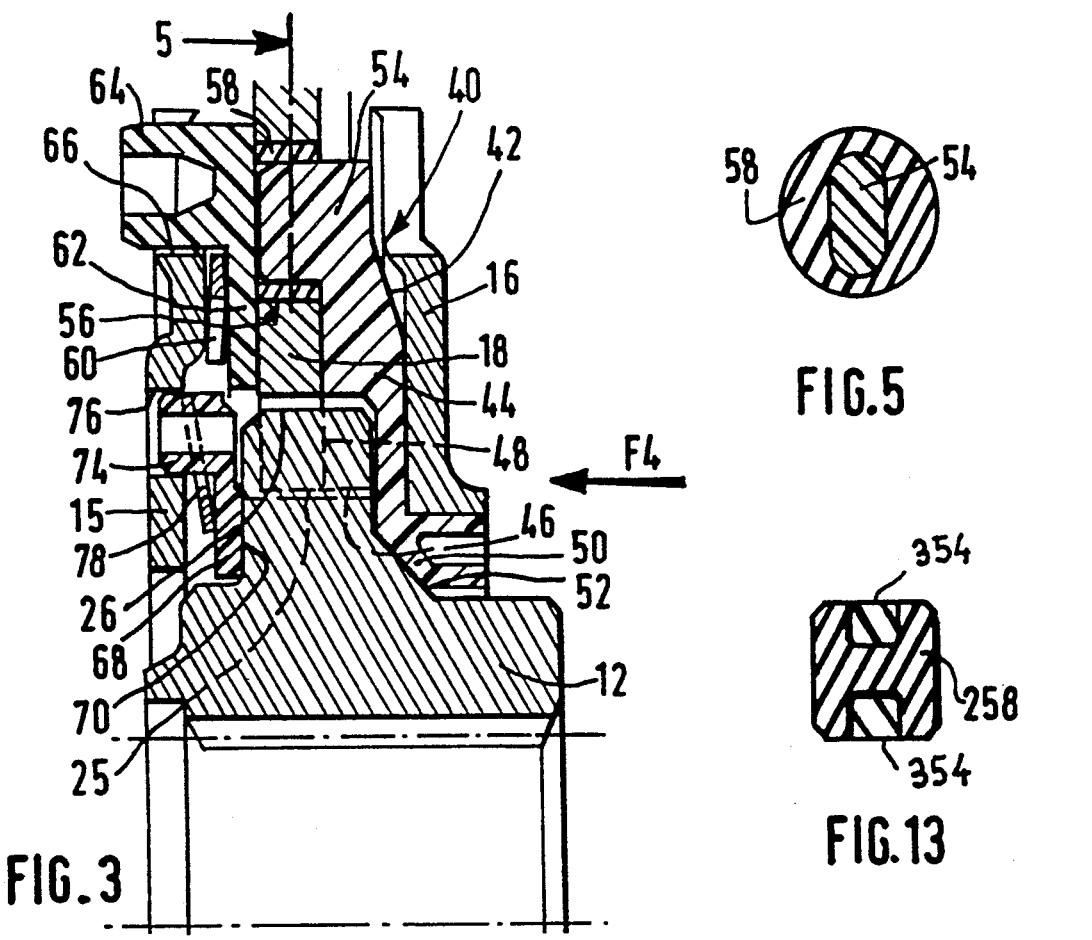
FIG. 3 is a view in axial cross section on one side of the central axis, of part of a friction clutch in accordance with the invention, showing the central zone in the region of the inner periphery of the clutch plate, and also showing a first embodiment of the shock absorbing ring that is provided in accordance with the invention.
FIG. 5 is a view in cross section taken on the line 5—5 in FIG. 3.
FIG. 13 is a view similar to FIG. 5 but showing a fifth embodiment of the shock absorbing ring.

Referring now to FIG. 3, in this embodiment the third resilient means are indicated by the reference numeral 40. They consist of an assembly that constitutes a shock absorbing ring 40 which comprises at least one substantially rigid first member 42 and at least one second member 58 which is resiliently deformable. In the present example, the first member 42 has the general shape of a ring. More precisely, the member 42 comprises a central annular portion 44 which extends in a radial and axial plane between the damper plate 18 and the guide ring 16. The radially inner peripheral edge 46 of the central portion 44 is formed with a set of teeth 48 of a rigid material, having a profile which is complementary to the set of teeth 26 on the hub 12, and such that in the rest position there is a circumferential clearance J1, which is smaller than the circumferential clearance J that exists in the rest position between the set of teeth 25 of the damper plate 18 and the set of teeth 26 of the hub 12.

The set of teeth 26 on the hub 12 (FIG. 3) is extended axially to the right, so that it can mesh simultaneously with the set of teeth 25 on the damper plate 18 and with a third set of teeth 48 which are formed on the first ring member 42 of the shock absorbing ring 40. The teeth of the set 48 are trapezoidal in shape (as are those in the other two sets of teeth 25 and 26). The teeth 48 are received with a clearance in complementary recesses defined between the hub teeth 26.

The annular portion 44 of the first member 42 is also extended radially inwardly, in a portion which constitutes a conical bearing 50 that is in contact with a corresponding conical surface 52 formed on the hub 12. The conical bearing 50 serves for centring the guide ring 16 on the hub 12, and has an axially oriented flange for cooperation with the guide ring 16, which itself has an axial flange.

In the vicinity of its radially outer edge, the portion 44 has a series of spigots 54, which extend axially towards the damper plate 18 and away from the axial flange of the bearing 50. The spigots 54 are spaced apart circumferentially, and the number of these spigots will depend on the particular application to which the assembly is to be put. Each spigot 54 is received in a corresponding hole or opening 56 which is formed in the damper plate 18, and is formed integrally with the first member or ring 42. The spigots 54 couple the shock absorbing ring 40 to the damper plate 18 by means of a resilient rotary coupling interposed between them. This coupling consists of a series of resiliently deformable second members 58 which are mounted in the holes 56. Each of these second members 58 is in the form of a ring of a resiliently deformable material such as rubber, and has an outer profile complementary to that of the hole 56 and an inner profile complementary to the outer profile of the spigot 54.

Referring now to FIG. 5, each spigot 54 has an oblong profile, with circumferential edges which are rounded in the form of semi-circles connected together through two straight parallel sides. Thus each spigot 54 is of generally pad-like shape. In a modification (not shown), each of these oblong spigots may have an oval or elliptical profile; but in all cases its oblong shape ameliorates the torque transmission.

As will have been understood from the foregoing, the subassembly 40 that comprises the substantially rigid first member 42 and the resiliently deformable member 58 constitutes a shock absorbing ring which is operatively connected between the damper plate 18 and the hub 12. The member 42 is, in this example, preferably of a plastics material having a low coefficient of friction, for example a polyamide. It acts as a spacing bearing which is coupled in rotation to the damper plate 18 with the rings 58 interposed. It will be realised that advantage can be taken of this bearing to form the set of teeth 48 integrally with it. This bearing accordingly has an additional function, and it is stiffened by the set of teeth 48. It will also be noticed that the central axial portion 44 of the first member 42 acts as a spacer between the damper plate 18 and the guide ring 16, and that advantage is taken of the space which is available at the level of the inner periphery of the damper plate 18, in order to accommodate the teeth 48.

Figure 4:
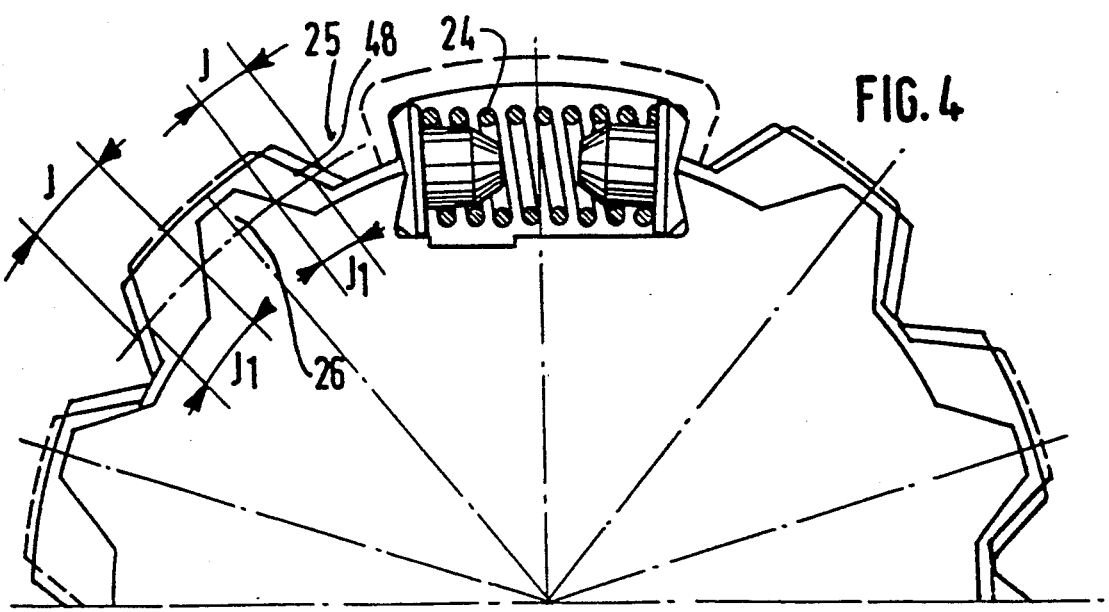
FIG. 4 is a view similar to FIG. 2, seen in the direction of the arrow F4 in FIG. 3 and showing part of the shock absorbing ring.

FIG. 4 shows the clearance J1 which exists between the teeth 26 and the teeth 48 and which, as already mentioned, is smaller than the clearance J between the teeth 25 and the teeth 26. None of the teeth 25 or 26 is notched, and they are able to come into abutment against each other due to the fact that the shock absorbing ring 40 extends in a direction parallel to the damper plate 18.

The torsion damper includes, in addition to the foregoing, an axially acting resilient ring 60 and a friction ring 62, which are interposed successively between the guide ring 15 and the damper plate 18 (as can be seen in FIG. 3). The friction ring 62, which is preferably made of a material having a low coefficient of friction such as a polyamide, is coupled to the guide ring 15 for rotation with the latter, by means of a plurality of spigots 64 which are received in complementary holes 66 formed in the guide ring 15. The resilient ring 60 consists in this example of a Belleville ring. It bears on the rings 15 and 62 so as to bias the ring 62 axially against the damper plate 18, and so as also to cause the central axial portion 44 of the shock absorbing ring 40 to be gripped between the damper plate 18 and the other guide ring 16.

A further ring 68 is arranged radially inwardly of the Belleville ring 60, between the radial face 70 of the projecting flange of the hub 12 and the guide ring 15. This ring 68 is generally similar to the friction ring 62, and is provided with spigots 74 which are received axially in complementary openings 76 formed in the guide ring 15. The rings 15 and 68 are thus coupled together in rotation by mating cooperation.

A further axially acting resilient ring 78, again in the form of a Belleville ring, is however also provided between the guide ring 15 and the ring 68. The Belleville ring 78 is less stiff than the Belleville ring 60. This resilient ring 78 is coupled to the ring 68 by mating engagement, for which purpose it has appropriate slots which cooperate with the spigots 74 of the ring 68. During operation, because the springs 19 are stiffer than the springs 24, the damper plate 18 is first caused to be displaced in a rotational sense with respect to the hub 12, against the resistive force exerted by the springs 24 and by the friction means 68, 78, 40, until the teeth in the set 26 come into contact with those of the set 48 of the first member 42. This provides a sound-deadening braking effect which is brought about by the rings 58. The effect is continued until the teeth 25 are in full engagement with the teeth 26. During this operation, the damper plate 18 and the guide rings 15 and 16 together form, effectively, a single component.

A second stage of the operation is that in which the damper plate 18 is now rotatable fully with the hub 12, and in this stage the springs 19 become compressed and the friction means 60, 62, 44 are in operation. The movement continues until the turns of the springs 19 come together, or until the spacers 17 (FIG. 1) come into engagement with the openings 21.

Figure 6:
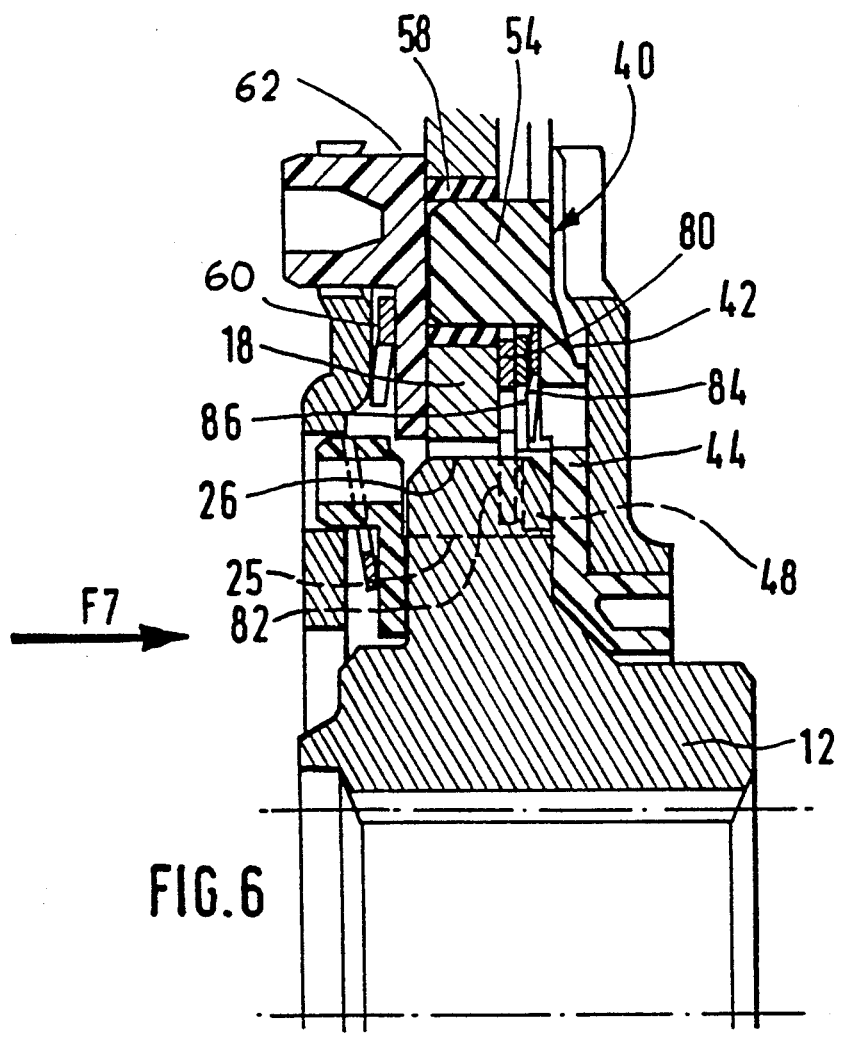
FIG. 6 is a view similar to that in FIG. 3, but showing a second embodiment of the shock absorbing ring in accordance with the invention.
Figure 7:
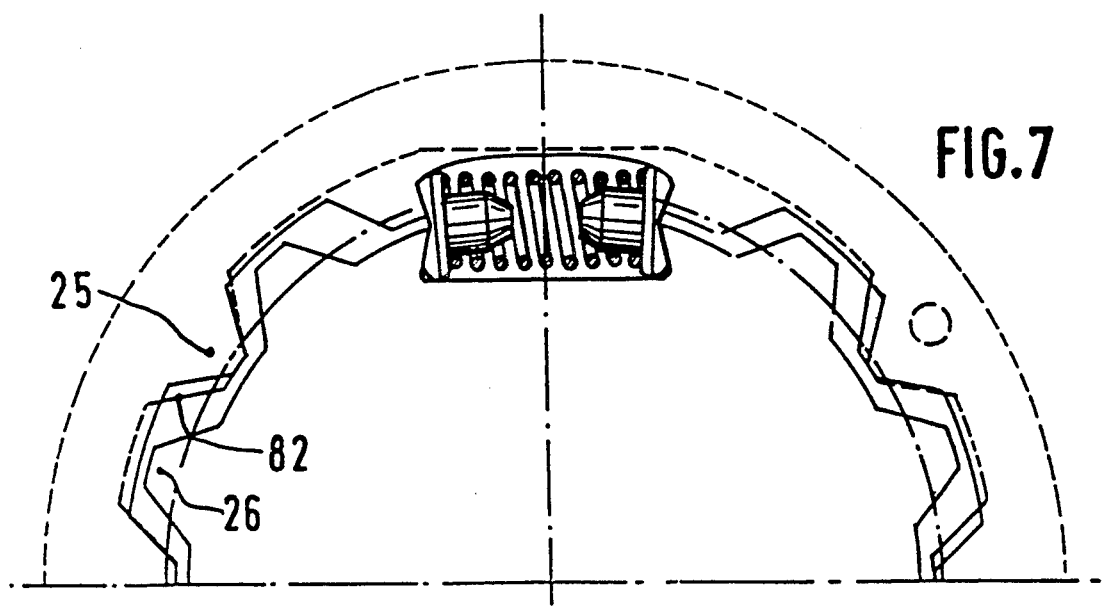
FIG. 7 is another view similar to FIG. 2, but showing a variable hysteresis ring which is also seen in FIG. 6.

Reference is now made to FIGS. 6 and 7. This embodiment differs from that shown in FIGS. 3 to 5 in that a variable-hysteresis supplementary ring 80 is disposed axially between the damper plate 18 and the central axial portion 44 of the first member 42 of the shock absorbing ring 40. The variable-hysteresis ring 80 includes a set of internal radial teeth 82, and is abutted resiliently against the damper plate 18 by means of an axially acting resilient ring 84 (which is here again of the Belleville ring type), bearing on the central axial portion 44 of the member 42. The Belleville ring 84 exerts a smaller force than the ring 60, and the spigots 54 are brought into cooperation with the friction ring 62 in such a way that the Belleville ring 84 is not compressed excessively.

As can be seen in FIG. 7, the set of teeth 82 is complementary to the sets of teeth 25 and 26, being arranged to define a circumferential clearance which is smaller than that existing between the teeth 25 and the teeth 26. The teeth 82 are so dimensioned as not to foul the teeth 48 of the shock absorbing ring 40. The variable-hysteresis ring 80 thus acts like a drawer, and also exerts a braking effect on the mutual engaging action of the teeth 25 with the teeth 26.

A further ring 86 is disposed between the resilient ring 84 and the variable-hysteresis ring 80, so as to spread the application of the axial load of the ring 84 on the ring 80. All the other components of the torsion damping device shown in FIGS. 6 and 7 are identical with those of the device seen in FIGS. 3 to 5, and are indicated by the same reference numerals. In operation, the variable-hysteresis ring 80 is caused to rub against the damper plate 18, with the clearance between the teeth 82 and 25 being taken up.

Reference is now made to FIGS. 8 to 10, showing a third embodiment. In these Figures, those elements that are identical or equivalent to those of the device shown in FIGS. 3 to 5 are designated by the same reference numerals but with 100 added. As shown in FIG. 8, the spigots 154 of the rigid first member 142 are received directly in the holes 156 formed in the damper plate 118.

The inner radial edge of the central portion 144 of the substantially rigid first member 142 of the shock absorbing ring 140 does not have teeth complementary to the teeth 126 of the hub 112 and the teeth 125 of the damper plate 118. A complementary set of teeth 148 is however formed in a rigid third member 90, which is again in the form of a ring and which extends in a radial plane, being disposed axially between the damper plate 118 and the central portion 114 of the first member 142.

In the vicinity of its radially outer periphery, the rigid third member 90 has a series of axial holes 92, through which the spigots 154 pass. A ring 158, of a resiliently deformable material such as rubber, is arranged around each spigot 154 and within the corresponding hole 92. The various elements 90, 142 and 158 together perform the same damping or shock absorbing function as the assembly constituted by the members 42 and 58 in FIGS. 1 to 3, with the rigid member 90 being resiliently coupled in rotation to the damper plate 118 through the spigots 154. To this end, and as is best seen in FIG. 9, the circumferential clearance J that exists between the teeth 148 and the teeth 126 is smaller than the circumferential clearance J that exists between the teeth 125 and the teeth 126. This embodiment operates, in all essentials, in just the same way as that already described with reference to FIGS. 1 to 3. All of the other components seen in FIGS. 8 to 10, whether or not they are indicated by reference numerals, are the same as those in FIGS. 3 to 5. It will be appreciated that the ring 140 and the damper plate 118 are substantially unchanged.

Figure 11:
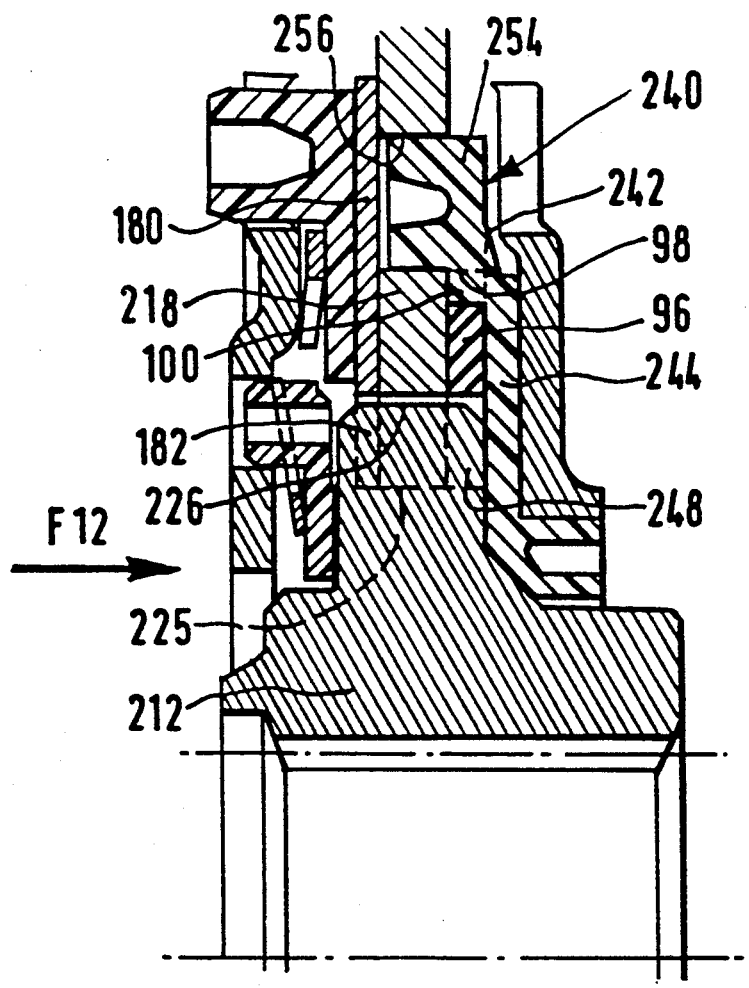
FIGS. 11 and 12 are views similar to FIGS. 6 and 7, but show a fourth embodiment of the shock absorbing ring.
Figure 12:
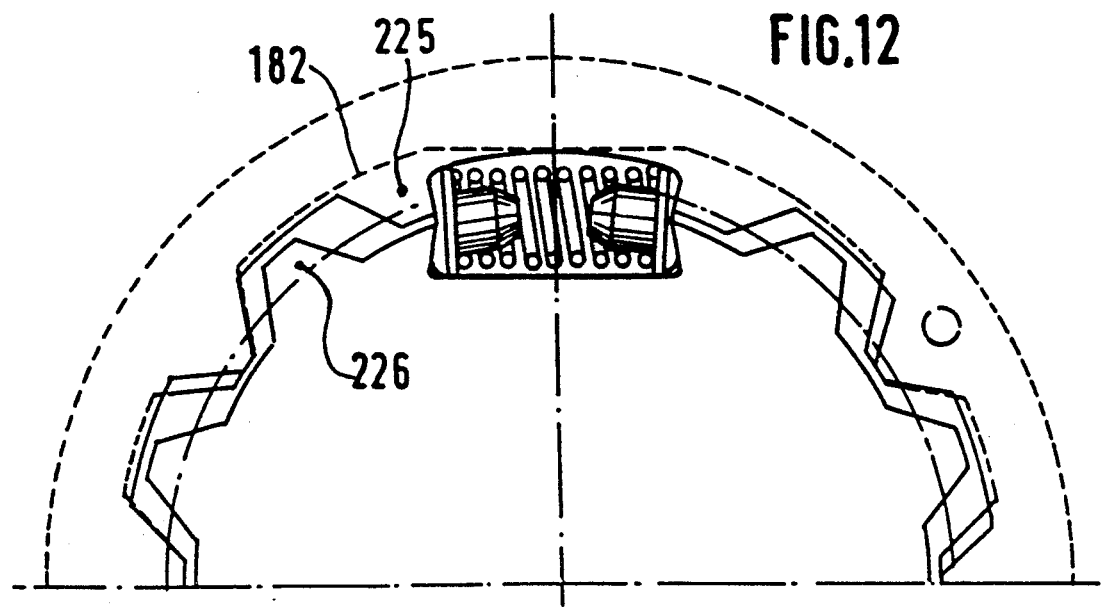

Referring now to FIGS. 10 to 12 showing a fourth embodiment of the torsion damper, in these Figures all those components that are identical or similar to those in the arrangement seen in FIGS. 3 and 4 are here indicated by the same reference numerals, but with 200 added. In FIGS. 10 to 12, the design of the rigid member 242 of the assembly that constitutes the shock absorbing ring 40 is identical to the first member 142 described and shown in FIGS. 8 to 10.

However, in this case the substantially rigid first member of the shock absorbing ring 40 consists of two parts, viz. a rigid third member 242 and a fourth member 96. The fourth member 96 is itself made in two parts, namely a rigid inner part having the third set of teeth, 248, formed around its radially inner profile, and a resiliently deformable outer part. The teeth 248 are complementary to the teeth 226 of the hub 212 and to the teeth 225 of the damper plate 218, and operate in the same way as the teeth 48 or 148 described in relation to the previous embodiments. The fourth member 96 is in the form of a ring, and extends radially and axially between the damper plate 218 and the central annular portion 244 of the rigid third member 242. It is joined resiliently in rotation to the damper plate 218 through the cooperation of slots 98, which are formed in its outer radial edge in a resiliently deformable material, with complementary profiles 100 on each of the spigots 254, with these latter being received directly in holes 256 of the damper plate 218. The profiles 100 and slots 98 thus constitute the resilient second member of the shock absorbing ring 40.

It will be appreciated that these complementary profiles 100 define a shoulder for contact with the damper plate 218, in such a way that the ring 96 runs no risk of being excessively stressed. Such a shoulder may of course also be provided in the other embodiments. The embodiment shown in FIGS. 11 and 12 again includes a variable-hysteresis ring, 180, having a set of teeth 182, which operates in exactly the same way as the variable-hysteresis ring 80 in FIGS. 6 and 7.

As will be evident from the foregoing and from the drawings, the first member comprising the elements 44, 90 and 96, which carries the teeth complementary to those formed on the hub 12, is provided with slots in the vicinity of the springs 24 so as to avoid any interference with the latter. This is for example visible in FIGS. 4 and 9. The same is so in respect of the variable histeresis rings, as can be seen in FIGS. 12 and 7.

The present invention is of course not limited to the various embodiments described above. In particular, the assembly of elements constituting the resilient shock absorbing ring may form part of a pre-damper which is arranged between the damper plate 18 and one of the guide rings in the manner described and shown in the specification of U.S. Pat. No. 4,883,156. In that arrangement, the set of teeth formed on the hub flange is extended in such a way as to mesh with the internal radial teeth of the shock absorbing ring. Preferably, the latter is then coupled in rotation with the axial spacers of the pre-damper, by mating cooperation of slots, formed in the shock absorbing ring, with the spacers which then nest in these slots.

In another modification, the circumferentially acting resilient means consist of blocks of resilient material. The circumferential clearances J and J1 may be symmetrical in the rest position of the assembly, by contrast with the situation in the embodiments described above in which they are asymmetric.

The spigots 54, 154 or 254, spaced apart circumferentially at regular intervals, may be bifurcated. In that case, and as seen in FIG. 13, the resilient rings 58 of FIG. 5 are replaced with H-shaped blocks 258 of a resilient material. Each spigot element 354 then penetrates into one branch of the H. The shock absorbing effect is obtained by means of the vertical portion of the blocks 258, with the horizontal portion of the H-shaped cross section of the block merely separating the spigot elements 254 from the block 258.

Finally, the bearing 142 or 242 may, instead of being conical, be of any other suitable shape, and a radial clearance may be provided between it and the hub.

What is claimed is:

1. A torsion damper comprising: a first damper part; a second damper part; first resilient means engaging between the said first and second damper parts; and means mounting the damper parts coaxially with each other for limited relative rotation against the action of the first resilient means, with one of the damper parts comprising: a damper plate having a first set of radial teeth; a hub having a second set of radial teeth coaxial with the damper plate, the said first and second sets of teeth cooperating with each other to define a first circumferential clearance between them, whereby in turn to define a sector of relative angular displacement between the damper plate and the hub; second resilient means engaging between the damper plate and hub; and means mounting the damper plate around the hub for the said limited relative rotation to take place against the action of the second resilient means, wherein the damper further includes third resilient means associated with the said first and second sets of teeth for enabling the latter to come into positive mutual abutment while providing a sound-deadening braking effect, and wherein the said third resilient means comprise a shock absorbing ring coupled to the damper plate for rotation with the latter and extending parallel to the damper plate, the shock absorbing ring having a third set of teeth complementary to the second set and meshing therewith, so as to define between them a second circumferential clearance smaller than the first circumferential clearance, the second set of teeth being of such actual extent that it can mesh with the first and third sets of teeth, with the shock absorbing ring comprising at least one substantially rigid first member on which the third set of teeth is formed, together with at least one resiliently deformable second member for rotational coupling with the damper plate.

2. A torsion damper according to claim 1, wherein the said substantially rigid first member comprises an annular portion having an inner radial edge on which the third set of teeth is formed, with the resiliently deformable second member coupling the said first member to the damper plate in rotation with the latter.

3. A torsion damper according to claim 2, wherein the damper plate is formed with at least one hole, the said rigid annular portion of the said first member having at least one spigot extending axially towards the damper plate and being received in a corresponding said hole of the latter with the deformable second member interposed.

4. A torsion damper according to claim 3, wherein the deformable second member is a ring of resiliently deformable material surrounding a said spigot, the latter having an oblong profile.

5. A torsion damper according to claim 1, wherein the said first member of the shock absorbing ring comprises a substantially rigid third member having the said annular portion and means coupling the said first member in rotation to the damper plate and a substantially rigid fourth member having the third set of teeth, with the said resiliently deformable second member being interposed between the rigid fourth member and the said annular portion of the third member, whereby to couple the third and fourth members together in rotation.

6. A torsion damper according to claim 5, wherein the damper plate has at least one hole, the said annular portion of the third member having at least one spigot extending axially towards the damper plate and being received in a corresponding said hole in the damper plate.

7. A torsion damper according to claim 6, wherein the said substantially rigid fourth member is arranged between the damper plate and the annular portion of the third member.

8. A torsion damper according to claim 7, wherein the fourth member has a series of axial holes through which the said spigots extend, with the said resiliently deformable second member being a ring of resiliently deformable material interposed around each said spigot within a corresponding one of the said axial holes.

9. A torsion damper according to claim 7, wherein the said fourth member comprises a rigid inner part having the said third set of teeth and a resiliently deformable outer part constituting the said resiliently deformable second member.

10. A torsion damper according to claim 9, wherein the resiliently deformable part of the said fourth member has a radially outer profile formed with slots, with each said spigot of the third member being so profiled as to be complementary with the said slots and cooperating with the latter, whereby to couple the said first member resiliently in rotation to the damper plate.

* * * * *